Jan. 26, 1943.  R. PEALE ET AL  2,309,355
MECHANISM FOR SEPARATING INTERMIXED DIVIDED MATERIALS
Filed Aug. 30, 1940  6 Sheets-Sheet 1
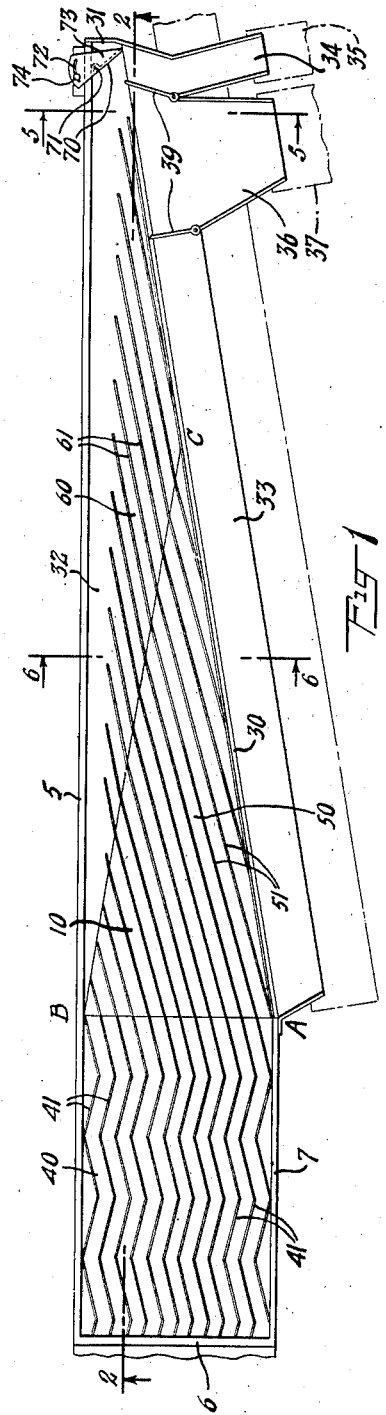
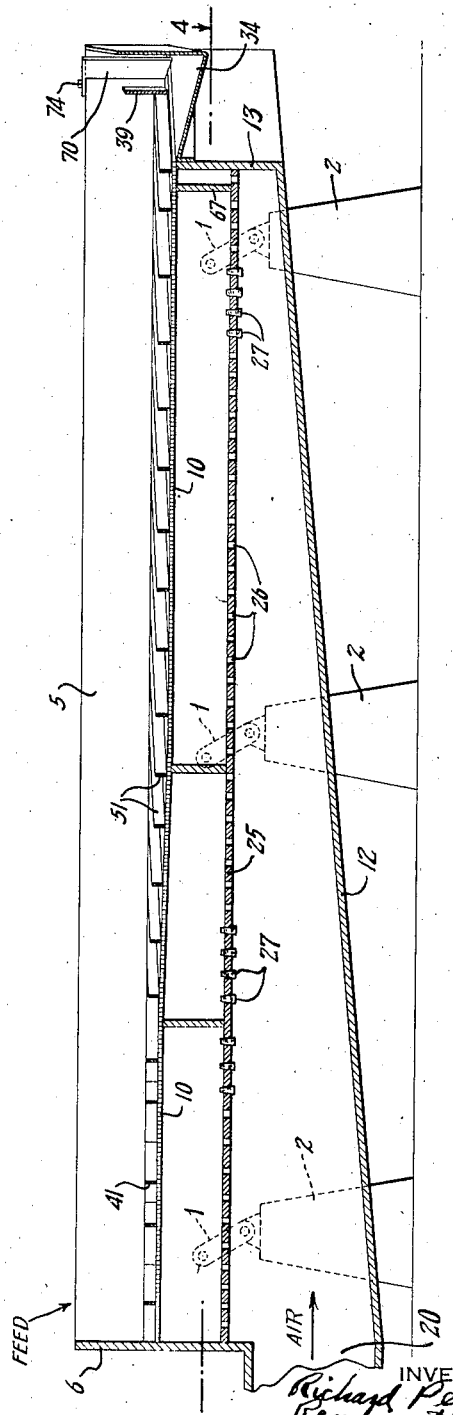

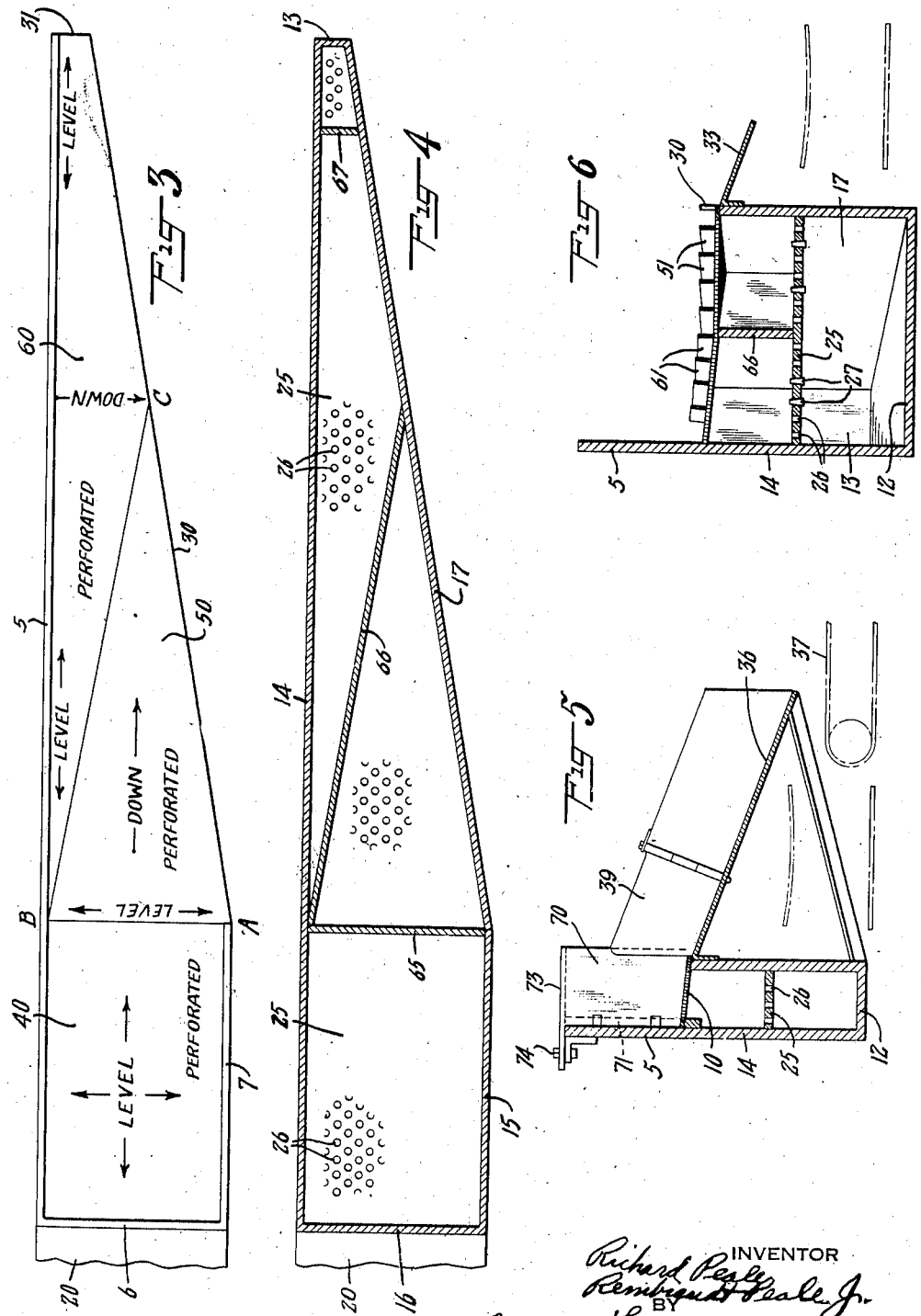

Jan. 26, 1943. R. PEALE ET AL 2,309,355
MECHANISM FOR SEPARATING INTERMIXED DIVIDED MATERIALS
Filed Aug. 30, 1940 6 Sheets-Sheet 3
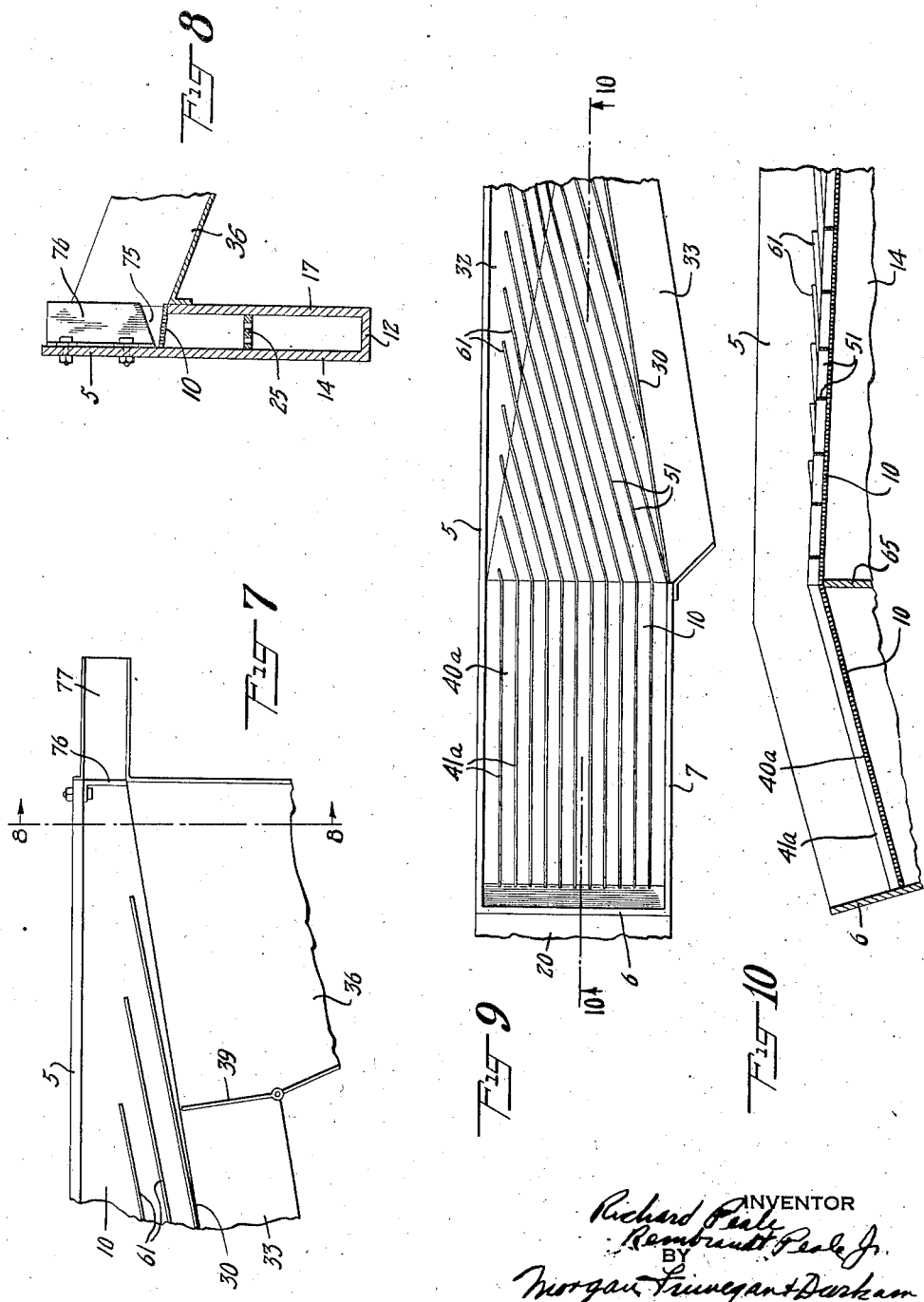

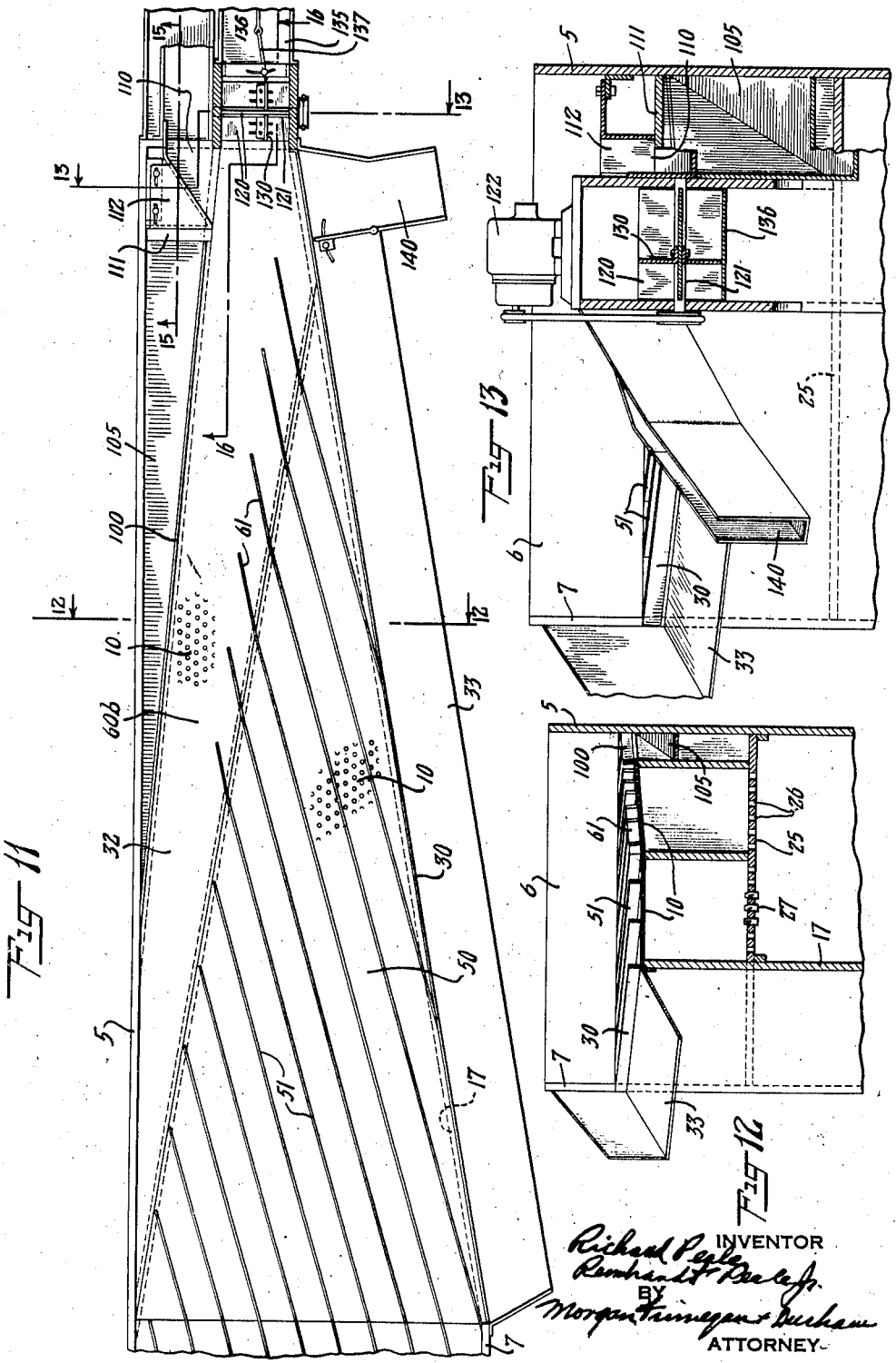

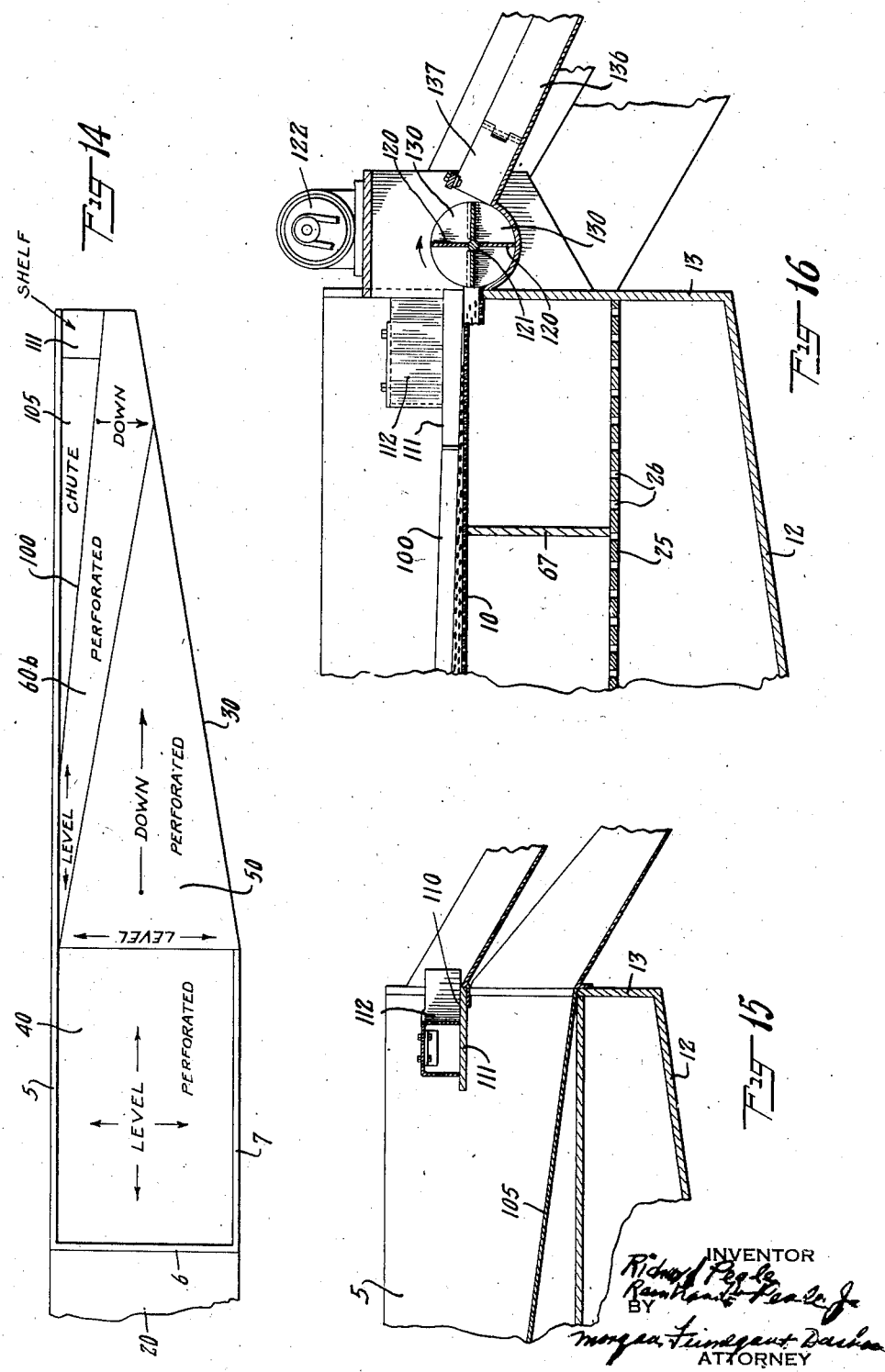

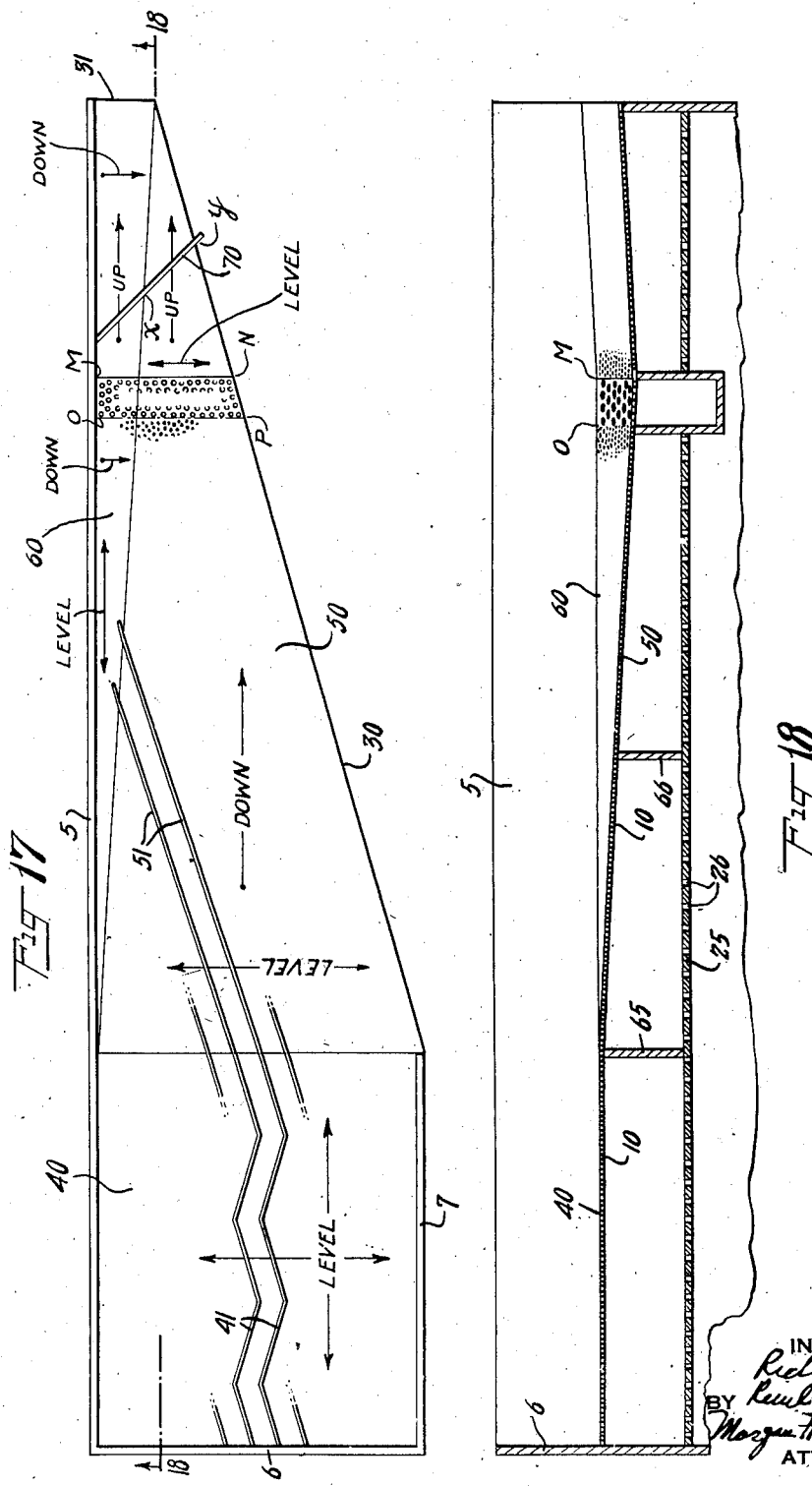

Patented Jan. 26, 1943

2,309,355

UNITED STATES PATENT OFFICE 2,309,355

MECHANISM FOR SEPARATING INTERMIXED DIVIDED MATERIALS

Richard Peale, Clearfield, Pa., and Rembrandt Peale, Jr., Greenwich, Conn.

Application August 30, 1940, Serial No. 354,810

3 Claims. (Cl. 209—467)

The invention relates to pneumatic separation of intermixed divided solid materials varying in specific gravity, particularly where the pieces or particles of the material vary relatively greatly in size as, for example, in the case of unsized coal. The invention is primarily an improvement over the present commercial practice and mechanism known in the trade as the Peale-Davis system.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a top plan view of a pneumatic separating table embodying the invention;

Fig. 2 is a vertical section on line 2—2 of Fig. 1;

Fig. 3 is a diagrammatic plan view of the separating deck with legends to indicate the slopes of the various areas;

Fig. 4 is a horizontal section of the air chamber taken on line 4—4 of Fig. 2;

Fig. 5 is a transverse vertical section on line 5—5 of Fig. 1;

Fig. 6 is a transverse vertical section on line 6—6 of Fig. 1;

Fig. 7 is a fragmentary plan view of the discharge end of a modified form of the type of table shown in Fig. 1;

Fig. 8 is a transverse vertical section on line 8—8 of Fig. 7;

Fig. 9 is a horizontal top plan of the rear and middle portions of a modified form of table;

Fig. 10 is a longitudinal vertical section on line 10—10 of Fig. 9;

Fig. 11 is an enlarged top plan view of the forward or discharge end portion of a modified form of separating table illustrating means for the fractional discharge of large coal pieces at the refuse concentrating side of the table;

Fig. 12 is a transverse vertical section on line 12—12 of Fig. 11;

Fig. 13 is a transverse vertical section on line 13—13 of Fig. 11;

Fig. 14 is a diagrammatic top plan with legends showing slopes of various areas on the deck of the table shown in Fig. 11;

Fig. 15 is a vertical section on line 15—15 of Fig. 11;

Fig. 16 is a section on line 16—16 of Fig. 11;

Fig. 17 is a view of a modified form of deck generally similar to that shown in Fig. 1, but having a different form of banking and terminal discharge construction; and Fig. 18 is a longitudinal section on line 18—18 of Fig. 17.

The chief difficulties in removing the impurities from coal by pneumatic stratification, especially unsized coal (size ranges greater than 2:1), are first, the tendency of the particles to classify horizontally according to size during the stratifying and separating action and second, the concentration and removal of refuse (heavier impurities) without loss of an undesirable quantity of coal therewith, especially coal in the larger size ranges. The major objects of the invention are to overcome the above-mentioned difficulties or disadvantages of the present process and thereby to improve the efficiency of separation.

Referring first to the causes and detrimental effects of horizontal size classification, it is known that the upward passage of air through a bed of unsized raw coal causes the finer particles to rise toward the surface of the bed, while the larger particles, both refuse and coal, sink to lower strata. Where the travelling bed is moved across a pervious support having refuse-guiding or separating strips disposed at an angle to the movement of the bed, the strips tend to draw or deflect the larger or lower pieces of coal in the same direction as the refuse, thereby inducing a size classification effect between the large and small particles of coal, inasmuch as the finer particles in the upper strata are not laterally displaced by the separating strips. To overcome the tendency of such transversely inclined separating strips to move the larger coal pieces in the same direction as the refuse, it is the practice to incline the deck or table transversely so as to cause the coal pieces to be aided by gravity to move more sharply across the inclined separating strips. However, the side pitch of the deck does not correct, but tends greatly to intensify the horizontal size classifying effect because the flotant fine particles in the upper part of the bed flow rapidly by gravity toward the lower side of the deck and away from the direction in which the separating strips tend to move the larger pieces. Thus it is impossible or very difficult to avoid detrimental size classification in a separating table having transversely disposed separating strips especially where the deck has a transverse pitch.

It is further known that horizontal size classification adversely affects cleaning results both with respect to the larger and the smaller sizes. In the areas of the bed where the larger sizes predominate there is an insufficient amount of fines to maintain the static air pressure within the bed necessary for efficient separation. On the other hand, the finer sizes congregate so thickly at the low side of the bed that the air action there is unduly obstructed and efficient stratification and cleaning impaired. It is further known that where horizontal size classification can be avoided and the different sizes of material can be fairly uniformly distributed throughout the bed, superior stratifying and cleaning action is obtained, especially with the finer sizer which are the more difficult to clean. Uniformity of size distribution tends to maintain more uniform fluidic conditions throughout the bed and thereby makes for better stratifying and separating action.

Heretofore efforts to avoid the detrimental effects of horizontal size classification have met with limited success. The principal type of cleaning tables and processes in which horizontal size classification does not take place is the so-called "trough type" table in which all strata are moved unidirectionally from feed to discharge without transverse displacement of one stratum with respect to another. In tables of the trough type it is the practice to move the coal and refuse in the same direction the entire length of the table and without having any transverse slope or pitch. While this practice avoids the horizontal size classifying effect referred to, the outstanding difficulty of the trough type tables is in the efficient removal of a clean or coal-free refuse, especially when separation is attempted with coal containing the larger sizes. The principal reason for this difficulty is that the refuse must be withdrawn through an opening or openings within the bed of coal and below the strata of the lighter material, so that there is a tendency for the coal particles to escape with the refuse. Such skimming operations are very difficult to carry out without loss of substantial quantities of coal, especially when the range of materials being treated contains pieces larger than one-half inch in size. It is then almost impossible to prevent finer coal particles from escaping through openings necessarily large enough to permit the passage of the largest pieces of refuse. Hence the efficiency of the stratifying action is largely impaired by the inefficiency of the skimming or refuse-discharging action.

The present invention is directed to overcoming the various difficulties of pneumatic separation hereinabove described by providing a separating process and mechanism embodying novel principles and means. In accordance with the invention, the bed of raw coal, of whatever size, is first caused to be thoroughly and efficiently stratified without permitting any horizontal size classification to occur. Thereafter in a second stage a separating action is initiated whereby a large proportion of the stratified coal is discharged and the settled refuse partly deflected, but without permitting horizontal classification to occur to any serious extent. As a final phase of the process, the settled refuse is guided and concentrated apart from the remaining portion of the stratified bed and in a manner which makes for the most efficient concentration of refuse without permitting the intermingling therewith of any undesirable quantity of unseparated coal.

As one measure in carrying out the above-described features of our process we provide for moving the coal bed successively over pervious deck areas having different longitudinal and/or lateral slopes as will be hereinafter disclosed in detail. A concomitant feature of the invention is a provision of means for handling and guiding the progress of the settled refuse and of the flotant coal strata so that as the materials move from one zone or area to another having different slopes, there will be no piling up or retardation of material movement. One novel principle here involved is the provision of steps and means for effecting substantially uniform speed of refuse travel as it moves from one area of the deck to another and in some cases the speed of refuse travel may even be accelerated in the transition movements so as to avoid possibility of piling or damming-up of the material travel. In carrying out this principle we correlate the relationships between the flowage retarding effects of gravity along and across the deck with the retarding action of separating strips disposed at various angles with respect to the direction of material travel and so coordinate the slopes and directions of inclination of the strips as to give the uniform or accelerated material flowage effects hereinabove referred to.

Another feature of the invention relates to a novel method and means of providing efficient final concentration of the refuse which has been concentrated by transverse movement after stratification. This feature of the invention comprises provision of a novel banking action as a final concentrating step for the refuse, the banking being carried out in such manner as to interfere virtually not at all with the stratification and efficient flowage of the coal and other materials in the bed.

Another novel principle disclosed in one modified form of the invention relates to a method and means of discharging a selected quantity of the lighter material (coal), particularly the larger sizes thereof, from the locus or area in the bed adjacent that where the settled refuse material is normally concentrated. In carrying out this novel principle we provide means for discharging the coarser pieces of coal, which have been delivered or deflected by separating strips to the refuse concentrating zone of the bed, while preventing discharge of the refuse therewith. At the same time the major quantity of stratified coal is discharged in the normal way from the opposite side of the bed. By utilizing this novel principle a large proportion of good coal which heretofore has been lost with the refuse is saved.

It will be understood that the foregoing general description and the following detailed description as well are exemplary and explanatory of the invention but are not restrictive thereof.

Referring now in detail to the present preferred embodiment of the invention, there is illustrated by way of example in Figs. 1 to 6 inclusive a present preferred embodiment of the invention. A coal cleaning table corresponding in general to the commercial form of Peale-Davis construction comprises a longitudinally reciprocable frame mounted for the usual forward and aft rocking motion upon inclined links 1, the lower ends of which are pivotally connected to fixed pedestals 2 and the upper ends pivotally connected to the frame of the table. The table drive and rotor are not shown, being common to the art. The table comprises in general an upper frame having a longitudinal side bed-retaining wall 5, a similar rear wall 6 and the shorter side wall 7. Supported within said walls is the air-pervious deck 10. Below the deck is provided an air-pressure chamber having an upwardly and forwardly inclined bottom 12 and a closed front end wall 13, side walls 14 and 15 corresponding in position to the bed-retaining walls 5 and 7 respectively, a rear wall 16 corresponding to retaining wall 6 and constituting a downward extension thereof and a diagonally inclined or oblique wall 17 connecting the ends of walls 13 and 15, so that the air chamber corresponds in outline to that of the deck 10. Air under pressure is introduced at the open rear end of the chamber below the wall 16, the conduit 20 at said end being connected with a fan or other source of air pressure in any suitable manner. Means for locally controlling the supply of air from the air chamber to the deck comprises the intermediately disposed cork deck 25 having a plurality of relatively large openings 26 through which the supply of air may be regulated by distribution of corks or stoppers 27. The air space between the cork deck 25 and the perforate bed deck 10 may be sub-divided as shown in Figs. 2 and 4 and as will be hereinafter more particularly described.

In general the construction of the table and deck is such that raw coal is fed to the rear end of same as indicated in Fig. 2 and under the influence of the rising air currents and the forward propelling reciprocation of the table, the bed of coal, preferably of substantial depth, is caused to progress generally forwardly along the deck from the rear end 1 toward the front. A relatively long, transversely inclined coal spillage edge 30 is provided extending from the front end of the short wall 7 toward the long wall 5 but terminating short thereof to leave a short end 31 at the forward end of the deck (Figs. 1 and 3). The refuse or heavier material which settles to the surface of the deck is ultimately guided by separating partitions to an unobstructed passageway 32 which extends throughout a substantial part of the length of the long wall 5 and the refuse concentrated in said passageway travels forwardly therealong to discharge at the end 31 of the table. A chute 33 is provided along the edge 30 for delivering the discharged coal and chute 34 is provided for the discharged refuse at the end of the table, preferably delivering same to a refuse belt 35. Preferably an intermediate discharge chute 36 is provided for a middlings product which it delivers to the middlings belt 37. Variably positionable dividing vanes 39 are provided at either side of the middlings chute to regulate its capacity with respect to the coal and refuse divisions.

In accordance with the invention, means are provided for effecting the major stratifying action on the bed of raw coal before any horizontal size classification of the materials is permitted to take place. More particularly, the use of transversely disposed separating strips or riffles which would tend to guide the settled refuse and the larger pieces of coal toward one side of the table together with a transverse inclination of the table which, as described above, tends to enhance the size classifying action, are both avoided in the earlier stages of our present process, but without detracting from the efficient separating action in those stages. As embodied, the rear rectangular portion or area 40 on the separating deck 10 is preferably level both in the longitudinal and transverse directions (Fig. 3). Thus in that area a full stratifying effect is accomplished without any tendency of the fine particles in the upper part of the bed to slide toward one side or the other. At the same time it is desirable to retard somewhat the tendency of the bed to travel forwardly too fast, which might be the case on a purely level deck. It is also desirable to initiate some control of the movement of the settled refuse in the early or stratification stage of the process. It is particularly important to prevent the refuse or rather the lower stratum from moving too rapidly during the preliminary stages of stratification and until the lowest stratum has become occupied entirely or chiefly by the heavier impure material. Consequently we provide for a relatively slow flowage movement of the bed and particularly of the lower stratum thereof during the preliminary or stratification phase of the process. In accordance with this feature of the invention, the rear area 40 of the table is provided with refuse guiding and separating strips, partitions or fins 41 which extend from the rear end 6 to the line A—B which marks the end of the rear area 40. Said separating strips are disposed in parallel zigzag relation as shown. The angle of the successive lengths of the zigzag or reversely angled strips is preferably about 18 degrees to the longitudinal axis of the deck first in one direction and then in the opposite. It will be clear that by so disposing the separating strips in the rear area 40, there will be no tendency to effect horizontal size classification of the materials because the pieces and particles acted upon by the strips are not drawn to one side of the bed or the other but, on the contrary, are given a somewhat wavering but ultimately forward direction. At the same time the effect of the reversely angled strips is to retard and control the movement of the settled material so that it will tend to travel relatively slowly over the level deck area 40. It will further be noted that in the area 40 no means are provided for removing the stratified refuse from the coal or for concentrating it at one side or the other of the bed.

In accordance with the invention, means are next provided for initiating discharge of substantial quantities of the flotant purified coal strata and to some extent concentrating settled refuse to the opposite side of the bed, while inhibiting any substantial size classification. This second area 50 is triangular between the points A, B and C, and as indicated in Fig. 3 it is level transversely but is preferably provided with a slight forward and downward inclination. In this area 50 the separating strips 51 are disposed parallel to each other and at a somewhat slighter angle transversely to the longitudinal axis. Such disposition of the separating strips initiates a sidewise concentrating movement of the settled refuse, but without disturbing the already established stratification of the bed. Although the separating strips in this area 50 are inclined toward the side of the deck, the tendency toward undesirable size classification is largely avoided in that area because there is no transverse inclination and the tendency of the bed is to travel forwardly due to the longitudinal down slope. At the same time due to the gradual narrowing of the deck, beginning at the point A, the coal strata have free discharge along the line A—C of the spillage edge 30. Thus in the area 50 the process action is confined largely to maintaining stratification without horizontal size classification while the settled refuse is gradually moved transversely toward the side away from the coal flow.

It will further be clear that the tendency of the materials in the area 50 is to travel somewhat faster than in the rear area 40. This tendency is due to the longitudinal down pitch, the release of barriers to the spillage of coal over the edge 30 and also to the uniform inclination of the separating strips 51 which do not retard the refuse travel over the deck to the same extent as the zig-zag strips 41 in the rear area.

The third and final stage of the separating action is carried out on the substantially triangular narrow area 60 of the deck beyond the line B—C. In that area the chief action is to concentrate the refuse which has substantially all been stratified to the bottom in the previous areas. In the area 60 the separating strips 61 are disposed forwardly and toward the side edge 5 at a still gentler angle, while the deck is level longitudinally but has a relatively steep side inclination downwardly from the side 5 as indicated in Fig. 3. The material having been largely stratified before reaching area 60, said area is used mainly to maintain stratification and to remove the refuse from the remaining coal, while permitting the undischarged coal to proceed to spillage with a minimum amount of size classification action. In this area the refuse moves along the separating strips into the unobstructed passage 32. At the same time the coal is caused to flow to discharge by the transverse inclination and narrowing of the deck. Any horizontal size classification in this area is not serious, because virtually complete stratification has taken place under optimum conditions in the areas 40 and 50. Furthermore, since the major part of the coal has already been discharged, a smaller amount of air can be used in the area 60 so that there is less tendency to blow the fines vertically to the top of the bed and thereby cause size classification. Because of the gentler inclination of the separating strips 61 in the area 60, refuse and other material affected by those strips tend to travel at an equal or slightly accelerated rate after crossing the line B—C. The side slope in area 60 also has a reactive effect on the coal in the area 50 tending to move same toward the spillage edge and thus facilitate the discharge thereof.

As hereinabove stated, the uniform or accelerated speed of refuse travel lengthwise of the deck is desirable to prevent piling of refuse along the separating strips especially at locations where the grades of the deck change. We will now give an illustrative example of how the relative inclinations of the separating strips may be predetermined. In order to keep the deck to a reasonable length and to utilize the spillage action of the gradually narrowing deck, it was determined to place the strips 61 in area 60 at about 15°, this being an angle at which relatively fine refuse would travel readily along a separating strip where a suitable side pitch of ½" per ft. is used. Computing the actual resistance to the travel of refuse afforded by the deflection of the 15° strips and the gravity opposition of the side pitch we find the following:

The gravity effect of the ½" per ft. side pitch along a strip 61 is .133" per ft.= .133/12=.011 tan=0° 40'. Hence the actual resistance along strip 61=15° plus 0° 40'= 15° 40', i. e., the resultant retarding angle considering the pitch and angle of the strip together.

In the area 50 the appropriate angle of 17° o the strip 51 is arrived at as follows:

Downhill pitch along strip 51 is .174" pe ft.=.174/12=.0145 tan=0° 50'. The actua resistance along strip 51 is therefore 17°—0 51'=the resultant of 16° 10'.

Therefore it will be clear that the refuse should move slightly faster along the 15° strip 61 although travelling slightly upgrade than refuse along the 17° strip 51 although the deck in the area 50 is slightly down grade. Consequently there is no tendency for the refuse in area 60 to be retarded or piled up because it actually travels faster in the area 60 than in the area 50.

Similarly in area 40 the level deck is provided with the reversely angled strips 41 set at an angle of 17° or 18° which on the level will have a greater retarding effect than the strips 51 and 61. It will be understood that the figures and calculations given above are exemplary on one particular table with certain conditions as to slope and length predetermined, but that the invention is applicable generally to any arrangement of separating strips, deck slopes and other factors which will induce the progressive acceleration of refuse travel along the deck, or at least avoid a deceleration thereof. Other factors may enter into the travel of the materials but in general they will be equally effective at all parts of the table. To some extent the rate of refuse travel can also be controlled by the air action in different areas. For this purpose the sub-air chamber between the deck 10 and the cork deck 25 is preferably sub-divided by walls corresponding to the borders of the respective areas 40, 50 and 60. Thus along line A—B there is provided a sub-chamber wall 65 and a similar inclined wall 66 along the line B—C. A relatively small sub-division may be formed at the discharge tip of the table by a transverse wall 67. In addition, if desired, the air action in the various areas may be further controlled by zoning of the pervious deck 10 as disclosed in previous Peale-Davis patents.

In accordance with another feature of the invention a modified form of banking action is applied to the concentrated refuse. We have observed that in prior efforts to utilize the banking principle, the banking action has been applied along a relatively great width or extent of the bed and along areas where the deliveries of refuse from the separating strips is opposed directly by the banking bar. In certain types of commercial tables a large proportion of the separating strips lead into or toward the banking bar and the banking bar itself is longer than the width of the decks. This arrangement is undesirable because the banking action is thus imposed upon the coal mass itself and the arrangement tends to concentrate coal against the banking bar to a great extent.

In the present invention a relatively short banking bar is applied to the final concentrating of the refuse after substantially all of the coal has been stratified and discharged from the deck. The banking action of said bar in our invention is not exerted against the mass of coal nor against the travel of refuse along the separating strips but is applied to the ultimately concentrated stream of refuse. While the concentration of refuse against a plate or bar is not broadly new, there are certain features of the arrangement here provided which are new and which make the concentration and discharge of refuse more efficient. One principle which we apply is to provide that the ratio of the width of the separating deck at the feed end to the effective length of the banking bar or concentration plate be in the same proportion as the total of raw coal is to the proportion of refuse material or "sink" content in the raw coal. For example, with a deck having a width of 36 inches at the feed end 6, and with a coal having a "sink" content of 10%, the width of the deck at the concentration plate location and the effective length of said plate should not exceed 3.6 inches.

As embodied, a concentrating plate or bar 70 is mounted at the forward end of the deck and preferably disposed at a slight forward angle thereacross, which angle may be varied by rotating the plate about the vertical pivot pin 71. The plate may be held in any desired position of adjustment by means of a slot 72 formed in the flange 73 at the top of the plate and a tightening bolt 74. As shown, the plate 70 extends across the end of the refuse channel 32 beyond the ends of the separating strips so that it acts upon the entire stream of refuse to bank and deflect same into the discharge chute 34. With different coals its angle of inclination will be varied.

A modification of the banking plate is shown in Figs. 7 and 8 where an inclined discharge opening 75 may be formed in the transversely disposed plate 76. Said opening communicates with a forwardly disposed chute 77 and is provided with a passage for the largest pieces of refuse at its widest point thereby permitting discharge of refuse of a large size range with a minimum loss of coal. As shown, the plate 76 is fixed at right angles to the axis of the table but if desired it may be inclined and variably positionable like the plate 70.

In Figs. 9 and 10 is shown a modified application of the principles of controlling the refuse travel along the deck hereinabove disclosed. In this form of the table the rear area 40a is provided with separating strips 41a which are parallel to the axis of the table, thereby imposing of themselves no restraint upon the flow of the refuse. The desired restraint and retardation of flow in the area 40a is provided in this case entirely by gravity from a relatively steep upward slope in said area, said slope being on the order of 3½" per foot. The area 40a is level transversely like the area 40 and is formed and operates the same in other respects. It will be clear that the inclination of 3½" per foot provides essentially the same resistance as a 16° separating strip by the following calculation:

Tan. 16°=0.28675×12″=3.441″ per foot

It will also be clear that other lower slopes of the area 40a may be combined with relatively slightly inclined zigzag strips so that various combinations of slope and strip inclination may be used to provide essentially the same refuse retarding effect.

In Figs. 17 and 18 there is shown another modification utilizing the general principles hereinabove set forth. In this deck the rear area 40 is the same as that in the form of Figs. 1 and 3 and will be provided in reversely angled separating strips 41 in the same manner. The triangular area A, B, C (area 50) is relatively great so as to provide the maximum amount of space in which there is no side pitch, while the triangular area 60 is relatively small and is primarily and almost entirely for the concentration of refuse. In this modified table special means are provided for facilitating the concentrating and discharge action on the refuse. As shown, the banking bar or plate 70 is positioned across the end of the table on a line which causes it to traverse a substantial portion of the deck which is level transversely, i. e., the portion XY. Thus there is a greater tendency to bank and concentrate refuse because the refuse will travel more slowly along the level line X—Y. Further means are provided for banking up the refuse at the end of the deck by providing a forward and upward inclination of the entire deck beyond the line M—N. Thus all the refuse which is delivered along the refuse channel 32 and by the separating strips of the area 50 is subjected to a gravity concentration as it reaches the bar. Separate removal of a substantial part of the settled fine refuse may be effected by providing a strip M—N—O—P just rearward of the line M—N, which strip is provided with relatively large holes through which the fine refuse will sift. One of the principal advantages of the deck disclosed in Fig. 17 is that no coal is discharged over the spillage edge 30 without passing over at least a certain area which is level transversely, thereby to further restrict the tendency toward horizontal size classification and its undesirable effects.

Referring now to the modified forms of our invention shown in Figs. 11 to 16 inclusive, same relate primarily to a novel means and method for disposal of the coarser coal which has been displaced transversely by the separating strips. In general deck construction said table is similar to that of the form first described herein, namely it has the rear, level stratifying area 40 and the intermediate triangular area 50 sloped as indicated in Fig. 14. The next forward area 60b is similar in general to the area 60 of Figs. 1–3 in that it is level longitudinally and inclined transversely toward the spillage edge 30. However, we provide a forwardly and inwardly inclined spillage edge having a low wall or strip 100 extending at an angle inwardly from the retaining wall 5. Said auxiliary spillage wall 100 is provided for the overflow of such relatively large pieces of coal as are drawn transversely by the separating strips 51 and 61 and which because of their lower specific gravity tend to float on top of the settled refuse in the concentrating channel 32. This construction thus provides for the immediate discharge of said large coal pieces instead of requiring them to travel transversely across the deck to the spillage edge 30 as heretofore. The separating or spillage strip 100 is of sufficient height to restrain the overflow of any refuse with said large pieces of coal, while the transverse inclination of the area 60b tends also to restrain such sidewise movement of the refuse.

Because of the relatively narrow width of the area 60b it is substantially all unobstructed by separating strips and thus affords primarily a concentrating channel for the forward travel of the refuse.

Means are provided for disposing of the coal which discharges over the spillage edge 100 and as embodied a forwardly and downwardly inclined chute 105 is provided along the wall 5 between it and the spillage edge 100. Said chute is so sloped as to be substantially below the main level of the deck at the forward end thereof and thus not to interfere with the discharge of refuse at said forward end. For the discharge of a coarse middlings product, i. e., material containing both coal and refuse at the end of said spillage edge 100, we provide a middlings discharge chute 110 which angles outwardly from the end of the spillage edge 100, lying upon a roofing plate 111 which bridges over the top of coal chute 105, thus providing for lateral dispostion of said middlings product. An adjacent plow 112 further aids in guiding middlings into the chute 110.

The main stream of refuse which travels along the channel 32 is caused to be delivered into a star wheel discharge mechanism. As shown, said device comprises four rectangularly disposed vanes 120 on a central rotating shaft 121 which is driven from a motor 122 mounted on the vibrating frame of the table. Said shaft 121 is mounted at the deck level so as to receive refuse delivered by passage 32 and transport same to the refuse chute 136 by rotation as indicated by the arrow (Fig. 16). This arrangement provides for a banking like retardation of the refuse in the passage as there is always a vane 120 projecting above the level of the deck as the vanes rotate to carry their load of refuse over to the chute 136. The rotation of the vanes is relatively slow so that any desired amount of retardation may be obtained by controlling the speed of the rotor. A second middlings chute may be made on the rotor itself by providing axially movable dividing blades 130 which are positionable along the shaft 121 so as to subdivide the rotary refuse discharge device into a refuse side and a middlings side. This middlings product is delivered into the side 135 of the sub-divided chute 136 and a positionable fin 137 is mounted in the chute 136 to carry the sub-division from the rotor to the chute. Other middlings are delivered to the side chute 140.

The invention in its broader aspects is not limited to the specific mechanism shown and described but departures may be made therefrom within the scope of the accompanying claims without departing from the principles of the invention and without sacrificing its chief advantages.

What we claim is:

1. In a pneumatic separator in combination a relatively long and narrow air-pervious deck which is longitudinally reciprocable, means for maintaining thereon a forwardly travelling bed of raw coal undergoing separation, a portion of said deck near the feed end being level transversely and longitudinally, an intermediate portion being level transversely and sloping down forwardly, and the next adjacent portion being transversely inclined and level longitudinally, and transversely inclined separating strips on said portions, the transverse inclination of the strips on the level portions being greater than those on the inclined portions.

2. In a pneumatic separator in combination a relatively long and narrow air-pervious deck which is longitudinally reciprocable, means for maintaining thereon a forwardly travelling bed of raw coal undergoing separation, a portion of said deck near the feed end being level transversely and longitudinally, an intermediate portion being level transversely and sloping down forwardly, and the next adjacent portion being transversely inclined and level longitudinally, transversely inclined separating strips on said rear portion for retarding forward travel of the refuse, and separating strips on said intermediate portion having a different transverse inclination, the transverse angle of said latter strips being such that the algebraic sum of angular component opposing forward refuse travel and the component of gravity affecting refuse travel along said strip are no greater than the sum of said components affecting the travel of refuse in said rear portion.

3. In a pneumatic separator in combination a relatively long and narrow air-pervious deck which is longitudinally reciprocable, means for maintaining thereon a forwardly travelling bed of raw coal undergoing separation, a substantial portion of the deck toward the feed thereof being level and provided with means for effecting stratification of the bed without horizontal size classification, said means including a plurality of separating strips extending in parallel zigzag relation along said deck portion to guide settled refuse forwardly therealong but at a rate slower than the travel of the superior flotant strata.

RICHARD PEALE.
REMBRANDT PEALE, Jr.